J. H. SOUTHARD.
AUTOTHEFT SIGNAL.
APPLICATION FILED JULY 14, 1919.

1,426,119.

Patented Aug. 15, 1922.

INVENTOR.
JOHN H. SOUTHARD,
BY
ATTORNEY.

UNITED STATES PATENT OFFICE.

JOHN H. SOUTHARD, OF GLENDALE, CALIFORNIA, ASSIGNOR TO MILLER-CHAPMAN COMPANY, A CORPORATION OF CALIFORNIA.

AUTO THEFT SIGNAL.

1,426,119.  Specification of Letters Patent.  Patented Aug. 15, 1922.

Application filed July 14, 1919. Serial No. 310,820.

*To all whom it may concern:*

Be it known that I, JOHN H. SOUTHARD, a citizen of the United States, residing at Glendale, in the county of Los Angeles, State of California, have invented a new and useful Auto Theft Signal, of which the following is a specification.

My invention relates to means for preventing the theft of automobiles and more particularly to a device which may be clamped around the tire to prevent the automobile from being operated without considerable inconvenience and danger of detection. There is at present on the market a device for clamping around a tire, this device having a spike or projection which projects from the tread of the tire so that if the automobile is started with this device in place the spike strikes the ground with a very noticeable blow so that the fact that the automobile is being driven by an unauthorized person is immediately evident to anyone in the neighborhood, and so that high rates of speed are absolutely impossible, due to the violence of the blow so struck. The objection has been made that it is possible by letting the air out of the tire to turn these previous devices around so that the spike will not strike the ground, the tire being thereafter re-inflated with the device in its displaced position.

An object of my invention is to provide a device which can be similarly clamped about a tire, but which will be so placed and so constructed as to lock the valve stem so that deflation is impossible.

A still further object of the invention is to utilize the valve stem to prevent the turning of the device while the tire is inflated, and a still further object of the invention is to provide a novel form of hinge which will obviate the necessity of any machining whatever on the device.

Referring to the drawings which are for illustrative purposes only,

Figure 1:
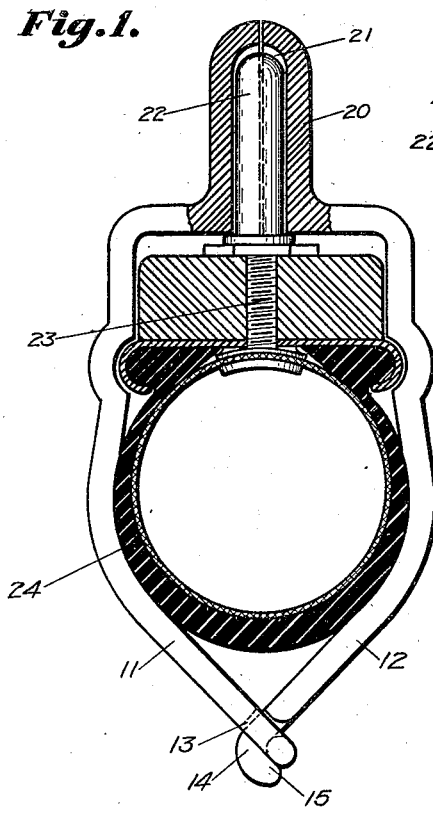
Fig. 1 is a section through a tire showing the device in elevation thereon.
Figure 2:
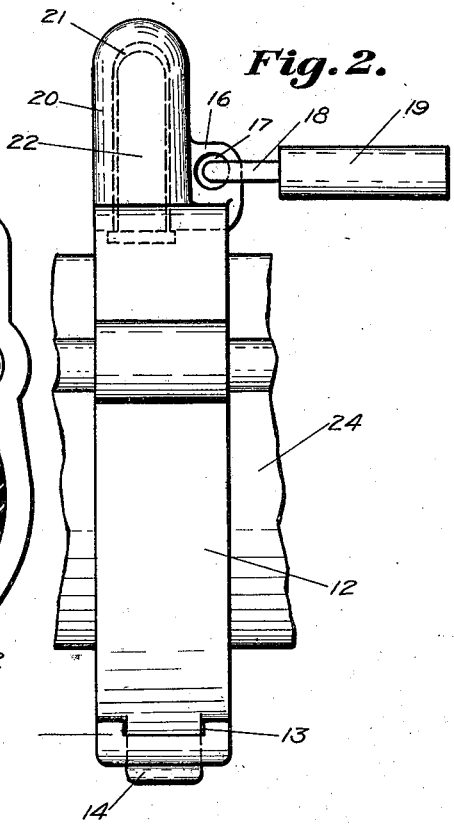
Fig. 2 is a side elevation of the portion of the tire with the invention placed thereon.
Figure 3:
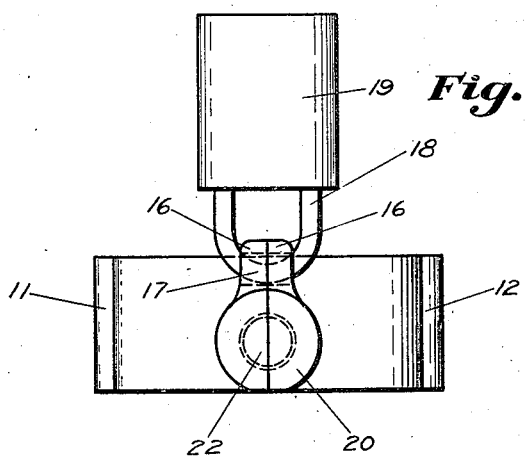
Fig. 3 is a plan view of the invention.

In the form of the invention illustrated in these drawings, co-acting members 11 and 12 are employed, the member 11 having a slot 13 therein, through which a tongue 14 formed on the member 12 may be inserted, the tongue 14 being hooked over as shown at 15 to prevent its withdrawal with the parts in their operative position as shown in the drawings. Formed in each of the members 11 and 12 is an ear 16 having a hole 17 therein, through which the hasp 18 of an ordinary padlock 19 may be passed for the purpose of locking the upper portion of the members 11 and 12 together. Also formed in each of the members 11 and 12 is a projection 20, having a semi-cylindrical recess 21 formed therein, in which the cap 22 of the valve stem 23 may be enclosed whenever the parts 11 and 12 are secured around the tire 24 as shown.

The method of operation is as follows:

The members 11 and 12 being separated and the lock 19 being removed, the members 11 and 12 are placed about a tire by inserting the tongue 14 into the slot 13 and passing the members 11 and 12 about the tire as shown in Fig. 1, the lock 19 then being snapped in place. When secured in this position the cap 23 is entirely covered and inaccessible, so that the tire can not be deflated by removing the cap 22 and releasing the valve carried in the valve stem 23. The valve stem 23 also serves to prevent any turning of the lock about the tire and the ends of the members 11 and 12 which carry the slot 13 and the tongue 14 serves as a projection to strike against the ground in the event that an attempt is made to move the automobile.

I claim as my invention:

1. An auto theft signal comprising: two members fitting about the valve stem of a tire; a hook formed on one of said members and so shaped that said members can be readily disassociated from each other when said signal is in the open position, said members being locked together by said hook when said signal is in the closed position; and means for locking said members together at a point remote from said hook.

2. An auto theft signal comprising: two members fitting about the valve stem of a tire; a hook formed on one of said members and so shaped that said members can be readily disassociated from each other when said signal is in the open position, said members being locked together by said hook when said signal is in the closed position; and a key operated lock connecting said members together at a point remote from said hook.

3. An auto theft signal comprising: two members; a hook formed on one of said members and so shaped that said members can be readily disassociated from each other when said signal is in the open position, said members being locked together by said hook when said signal is in the closed position; and means for locking said members together at a point remote from said hook.

4. An auto theft signal comprising: two members; a hook formed on one of said members and so shaped that said members can be readily disassociated from each other when said signal is in the open position, said members being locked together by said hook when said signal is in the closed position; and a key operated lock connecting said members together at a point remote from said hook.

In testimony whereof, I have hereunto set my hand at Los Angeles, California, this 3rd day of July, 1919.

JOHN H. SOUTHARD.